(12) United States Patent
Bidstrup et al.

(10) Patent No.: US 6,689,833 B1
(45) Date of Patent: *Feb. 10, 2004

(54) FLUOROPOLYMER STABILIZATION

(75) Inventors: David Elton Bidstrup, Parkersburg, WV (US); Leslie Mitchell Blair, Parkersburg, WV (US)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,470

(22) Filed: Feb. 13, 1998

Related U.S. Application Data

(60) Provisional application No. 60/041,843, filed on Apr. 9, 1997.

(51) Int. Cl.$^7$ ............................. C08K 3/10; C08K 3/28
(52) U.S. Cl. ...................... 524/429; 524/779; 524/780; 524/787; 524/796
(58) Field of Search ................................ 524/429, 787, 524/796, 779, 780

(56) References Cited

U.S. PATENT DOCUMENTS

| | | | |
|---|---|---|---|
| 2,946,763 A | | 7/1960 | Bro et al. .................. 260/45.5 |
| 2,955,099 A | | 10/1960 | Mallouk et al. ........... 260/45.7 |
| 3,085,083 A | | 4/1963 | Schreyer .................... 260/87.5 |
| 4,368,296 A | * | 1/1983 | Kuhls et al. ................ 525/276 |
| 4,380,618 A | | 4/1983 | Khan et al. ................. 526/206 |
| 4,384,092 A | * | 5/1983 | Blaise et al. ................ 526/225 |
| 4,391,930 A | * | 7/1983 | Olson ......................... 523/219 |
| 4,408,007 A | * | 10/1983 | Kuhls et al. ................ 524/546 |
| 4,626,587 A | | 12/1986 | Morgan et al. ............. 528/481 |
| 4,743,658 A | | 5/1988 | Imbalzano et al. ...... 525/326.4 |
| 4,764,538 A | * | 8/1988 | Buckmaster et al. .......... 521/85 |
| 4,840,998 A | * | 6/1989 | Shimizu et al. ............. 525/276 |
| 5,176,958 A | * | 1/1993 | Shimizu et al. ............. 428/402 |
| 5,180,803 A | | 1/1993 | Gibbard ..................... 528/488 |
| 5,284,708 A | * | 2/1994 | Shimizu et al. ............. 428/402 |
| 5,306,772 A | * | 4/1994 | Mimura et al. ................ 525/92 |
| 5,830,923 A | * | 11/1998 | Venkataraman .............. 521/64 |
| 5,885,494 A | * | 3/1999 | Venkataraman et al. ... 264/46.5 |

FOREIGN PATENT DOCUMENTS

| | | | |
|---|---|---|---|
| EP | 0 789 038 | | 8/1996 |
| GB | 917223 | * | 1/1963 |
| WO | 97/07147 | | 8/1996 |

* cited by examiner

*Primary Examiner*—Judy M. Reddick

(57) ABSTRACT

Fluoropolymer resin is stabilized and/or whitened by addition of a small amount of alkali metal nitrate prior to extrusion. The nitrate can be introduced during polymerization, isolation, or preparation of extruder feed.

3 Claims, No Drawings

FLUOROPOLYMER STABILIZATION

RELATED APPLICATION

This application claims the benefit of Provisional Application No. 60/041,843 filed Apr. 9, 1997.

FIELD OF THE INVENTION

This invention is in the field of fluoropolymer resins, and deals with the stabilization of such resins having unstable end groups.

BACKGROUND OF THE INVENTION

Melt-fabricable copolymers of tetrafluoroethylene (TFE) and various copolymerizable mononmers such as hexafluoropropylene (HFP) are well known, as are polymerization processes for making them. Bro & Sandt in often-cited U.S. Pat. No. 2,946,763 disclose an aqueous process for TFE/HFP copolymers using water-soluble free-radical initiator. As a consequence of the initiators used, TFE copolymers made by aqueous processes such as that of Bro & Sandt have unstable end groups, notably —COOH or salts thereof, that can decompose during subsequent processing and result in unacceptable bubbling in finished products.

Various processes for stabilizing the end groups of such polymers have been devised. Schreyer, for example, in U.S. Pat. No. 3,085,083 discloses a humid heat treatment process for improving the stability of such polymers by converting unstable carboxylate end groups to relatively stable —$CF_2H$ (hydride) end groups. Imbalzano & Kerbow in U.S. Pat. No. 4,743,658 disclose fluorine treatment of copolymers of TFE and perfluoro(alkyl vinyl ether) (PAVE) to reduce the population of unstable end groups to very low levels. Such polymer finishing steps are time-consuming and costly.

Morgan & Sloan in U.S. Pat. No. 4,626,587 disclose a high-shear thermo-mechanical process for reducing the backbone instability in TFE/HFP copolymers. It is disclosed that, if the polymer contains unstable end groups or has poor color after removal from the high-shear extruder, such problems can be eliminated by fluorination (contact with elemental fluorine). All of Examples 1–3 of Morgan & Sloan did in fact have poor color after backbone stabilization by extrusion, as indicated by low values (5–18) of the %G color parameter, and required fluorine treatment to improve %G to the 49–54 range. As mentioned above, fluorine treatment is costly.

Mallouk & Sandt in U.S. Pat. No. 2,955,099 disclose viscosity stabilized TFE/HFP interpolymers prepared according to the Bro & Sandt '763 patent for which the viscosity stability is achieved by incorporation of cationic metal compound. Compounds of cationic metals such as potassium, caesium and rubidium, particularly in the form of salts of labile anions such as iodide and bromide, are said to be most active. Potassium perchlorate is said to be used with particular advantage to improve color since it functions in the dual role of oxidant and viscosity stabilizer. However, Mallouk & Sandt also disclose that compounds of cationic metal with anions such as carbonate and nitrate tend to cause inhomogeneities in the interpolymer and are therefore not suitable for use as viscosity stabilizers. As shown by the Reference Example below, TFE/HFP interpolymers prepared according to Bro & Sandt, additionally, are not suitable for use in the process of the present invention.

Gibbard in U.S. Pat. No. 5,180,803 discloses a method for the production of a melt-fabricable fluoropolymer, which method comprises, after preparing an aqueous dispersion of the fluoropolymer using dispersion polymerization with an initiator that yields carboxylic acid groups on the fluoropolymer, converting the carboxylic acid groups on the fluoropolymer in the aqueous dispersion to carboxylate anion groups using a base and then heating the so-modified fluoropolymer dispersion to a temperature of 190°–240° C. to cause simultaneously (1) substantial removal of carboxylate anion groups, thereby to yield stable groups in their place, and (2) isolation of the fluoropolymer from the dispersion by coagulation of the fluoropolymer dispersion. Gibbard's EXAMPLE 1 discloses stabilization and isolation of TFE/HFP copolymer manufactured by the process of Bro & Sandt by addition of 1 wt % of potassium hydroxide, based on dry polymer solids, followed by neutralization with nitric acid which would correspond to formation of about 1.6 wt % of $KNO_3$, again based on the weight of dry TFE/HFP copolymer solids. One skilled in the art would then expect about 1700–4000 ppm of $KNO_3$ to be in the copolymer resin after isolation and drying.

TFE/HFP copolymers of the prior art, such as mentioned above, prepared by the process of Bro & Sandt have a high degree of instability, with end group and backbone contributions. This instability may be characterized by measurement of a total unstable fraction (TUF), as described herein. Polymers of the Bro & Sandt type generally have TUF of at least 0.5% when melt viscosity is in the range of $1-10\times10^3$ Pa·s.

SUMMARY OF THE INVENTION

A new polymerization process for TFE/HFP/PAVE copolymers, disclosed in European Patent Application 96-112948 (Publication 0 789 038), yields copolymer having high stability, characterized by a total unstable fraction of no more than 0.3%. In this process, copolymerizing is carried out with chain transfer agent present and with initiator present in an amount effective to initiate no more than half of the copolymer molecules made. The combined use of increased CTA and reduced initiator results in a TFE/HFP copolymer having improved total stability, i.e., the combination of reduced backbone instability and a reduced —COOH end group population. The resultant TFE/HFP copolymer can be used for many purposes without special stabilization finishing steps. However, if very high stability or complete absence of discoloration is required, some additional treatment such as fluorination would be necessary.

The problem of obtaining TFE/HFP copolymer and other melt-fabricable fluoropolymer resins of even higher stability and/or good color to permit commercial use without a costly stabilization finishing procedure is solved by a convenient and inexpensive process. The process for stabilizing and whitening melt-fabricable fluoropolymer resin having total unstable fraction, as defined herein, of no more than 0.3%, comprises extruding said resin in the presence of alkali metal nitrate to obtain said fluoropolymer resin having improved color and/or stability. The nitrate can be introduced into aqueous polymerization of the fluoropolymer, before isolation of the fluoropolymer solids from the aqueous dispersion, or after isolation of the resin from the polymerization medium and prior to melt extrusion. Preferred fluoropolymers for treatment by this process are tetrafluoroethylene copolymers.

DETAILED DESCRIPTION

It has been discovered that a small amount of alkali metal nitrate present during melt extrusion of fluoropolymer resin having a low level of instability as delivered to the extruder results in improved stability and/or color.

The fluoropolymers for which the process of this invention is suitable are melt-fabricable. As such, they generally have melt viscosity (MV) in the range of $0.5–50\times10^3$ Pa·s, though MV outside this range is known. MV of $1–20\times10^3$ Pa·s is preferred.

Preferred fluoropolymers for the process of this invention include melt-fabricable copolymers of TFE with a sufficient amount of at least one fluorinated comonomer to reduce the melting point of the copolymer substantially below that of homopolymer polytetrafluoroethylene, e.g., to a melting point of no more than about 320° C. Comonomers that can be copolymerized with TFE include, for example, HFP and fluorinated vinyl ethers (FVE) of the formula $CF_2=CFOR$ or $CF_2=CF—OR'—OR$ wherein —R and —R'— are independently completely-fluorinated or partially-fluorinated linear or branched alkyl and alkylene groups containing 1–8 carbon atoms. Preferred —R groups contain 1–4 carbon atoms, while preferred —R'— groups contain 2–4 carbon atoms. FVE of the formula $CF_2=CFOR$ are preferred, particularly perfluoro(alkyl vinyl ether) (PAVE). Preferred TFE copolymers include TFE/PAVE and TFE/HFP/PAVE. Preferred PAVE include perfluoro(methyl vinyl ether) (PMVE), perfluoro(ethyl vinyl ether) (PEVE), and perfluoro (propyl vinyl ether) (PPVE). As one skilled in the art will recognize, the amount of comonomer used will vary with the properties desired and the type of comonomer, which in turn may result in different melting points. This is illustrated, for example, by typical TFE/HFP (FEP) and TFE/PAVE (PFA) copolymer resins as described, respectively, in ASTM Standard Specifications D-2116 and D-3307.

Fluoropolymers subjected to the process of this invention can be characterized by weight loss as a result of controlled high temperature exposure. The method employed is designed to measure total unstable fraction (TUF). As described below, TUF involves the difference between weight losses measured after exposure for different times at high temperature in dry nitrogen. TUF is used herein to characterize the fluoropolymer subjected to the proecess, i.e., the feed to extrusion, as well as to illustrate the effect of this invention. TUF for melt-fabricable fluoropolymer used in the process of this invention is no more than 0.3%, preferably no more than 0.2%.

Fluoropolymer having TUF of no more that 0.3% can be prepared by various methods. Generally, it is desirable to prepare such fluoropolymer directly in polymerization. This can be done, for example, in aqueous polymerization of TFE/PAVE copolymer by using using chain transfer agent (CTA) that yields relatively stable end groups, or in aqueous polymerization of TFE/HFP/PAVE copolymer using a balance of CTA along with chosen HFP and PAVE concentrations, or by use of initiators that yield stable end groups in non-aqueous or in suspension polymerizations. One skilled in the art will recognize that fluoropolymer suitable as feed for the process of this invention, i.e., having TUF of no more than 0.3%, can be prepared from fluoropolymer initially less stable by subjecting this initial fluoropolymer to a preliminary stabilization process to reduce TUF to 0.3% or less. However, it is generally desirable to avoid such preliminary stabilization, if possible.

After subjecting melt-fabricable fluoropolymer resin to the process of this invention, the fluoropolymer will have improved stability or improved color, or both. Improved stability can be indicated by a reduced population of unstable end groups, and color may be improved. The color of fluoropolymer resin extruded according to the process of this invention is generally good, usually having color parameters $\%G \geq 35$, $YI \leq 10$, and $WI \geq 35$, preferably having color parameters $\%G \geq 40$, $YI \leq 6$, and $WI \geq 40$. More preferably, $\%G \geq 45$, $YI \leq 0$, and $WI \geq 50$.

As used herein, "extrusion in the presence of alkali metal nitrate" signifies that nitrate is introduced into the fluoropolymer resin prior to melt extrusion. The nitrate can be introduced into the resin during any process step prior to extrusion, including polymerization, isolation of polymer solids from the polymerization medium, drying, and preparation of extruder feed. For fluoropolymer prepared by aqueous dispersion polymerization, a preferred point for introducing the nitrate is during isolation. Preferred points for introducing alkali metal nitrate also include during polymerization because of the uniform distribution of nitrate that results. Contrary to expectation, polymerization is not adversely affected by the presence of nitrate. While nitrate can be introduced at more than one point in the process, e.g., during polymerization and again in the extruder feed, a single addition will normally be employed. The nitrate can be introduced as a solid or as an aqueous solution, as desired and as appropriate to the process step chosen for introduction. When introduced into aqueous polymerization, it is convenient to pump a solution into the reactor. On the other hand, one would normally introduce alkali metal nitrate into extruder feed as a dry solid blended with the resin or co-fed with the resin. It is also possible to inject a nitrate solution into the extruder if the extruder is of appropriate design. The alkali metal nitrate, of course, can be formed in situ, e.g., by introducing appropriate acid and base in an aqueous process step, but it is simpler to introduce the nitrate as such. Alkali metal nitrate will usually be present at the first extrusion of the fluoropolymer resin, a situation that necessarily follows if the nitrate is introduced during a wet process step. The first extrusion is normally part of the fluoropolymer resin finishing procedure, to prepare the resin for commercial use in a form such as pellets or cubes. However, one skilled in the art will recognize that such first extrusion could result in fabrication of a finished article, e.g., film or tubing. Likewise, one will recognize the possibility of adding alkali metal nitrate to resin that has been previously extruded, either with or without nitrate present.

Any alkali metal nitrate can be used in the practice of the present invention. Preferably, the alkali metal is potassium or sodium. One skilled in the art will recognize that a combination of alkali metal nitrates can be used.

Preferably, the amount of alkali metal nitrate used in the process of this invention is in the range of 20–500 ppm, most preferably 50–250 ppm, by weight based on the weight of dry fluoropolymer resin feed to extrusion, with the amount of alkali metal nitrate normalized to the molecular weight of potassium nitrate. Thus, if introduced during polymerization or a wet isolation step, the amount of nitrate added would be increased to compensate for the amount of salt that is carried off by the separated water. If nitrate is introduced during more than one process step, the amounts recited above apply to the combined amounts as calculated for each introduction. Amounts of alkali metal nitrate greater than 500 ppm can have a beneficial effect on color but an adverse effect on high-temperature stability of the fluoropolymer resin, e.g., as indicated by MV. Thus, as the amount of alkali metal nitrate is increased above 500 ppm, improvement in color may be at some sacrifice in resin stability. In some applications, some reduction in MV is tolerable. To minimize this adverse effect, the amount of alkali metal nitrate will be no greater than 1000 ppm.

Methods of melt-extrusion that can be used in the process of this invention include methods known in the art for use with fluoropolymers. Extruders that can be used include twin-screw and single-screw extruders. Twin-screw extruders such as those supplied by Werner & Pfleiderer are preferred. One skilled in the art will recognize such alternative possibilities as compounding fluoropolymer resin in the presence of nitrate in high intensity mixers, such as a Henschel mixer, followed by melt extrusion of the compounded resin. This is considered to be melt-extrusion in the presence of nitrate and within the scope of the present invention.

EXAMPLES

Fluoropolymer compositions were determined on 0.095–0.105 mm thick films pressed at 300° C., using Fourier transform infrared (FTIR) spectroscopy. For HFP determination, the method described in U.S. Pat. No. 4,380,618 was used. In applying this method, the absorbances of bands found at about 982 cm$^{-1}$ and at about 2353 cm$^{-1}$ were used. HFP content is expressed as an HFP index (HFPI), the ratio of the 982 cm$^{-1}$ absorbance to the 2353 cm$^{-1}$ absorbance. HFP content in wt % was calculated as 3.2×HFPI.

PEVE was determined from an infrared band at 1090 cm$^{-1}$ using FTIR spectroscopy. PEVE content in wt % was calculated as 1.3×the ratio of the 1090 cm$^{-1}$ absorbance to the 2353 cm$^{-1}$ absorbance. The absorbance at 1090 cm$^{-1}$ was determined using a TFE/HFP dipolymer reference film to minimize the effect of a strong absorbance that overlies the 1090 cm$^{-1}$ band. The 2353 cm$^{-1}$ internal thickness absorbance was determined without use of reference film.

The PPVE content of TFE/PPVE copolymers was determined from an infrared band at 990 cm$^{-1}$ and was calculated in wt % as 0.97×the ratio of the 990 cm$^{-1}$ absorbance to the 2353 cm$^{-1}$ absorbance.

End group analysis was also done by FTIR spectroscopy in a modification of the method disclosed in U.S. Pat. No. 3,085,083, using films 0.1–0.2 mm thick prepared by pressing at room temperature. The absorbance at 3557 cm$^{-1}$ was used to determine the population of —COOH end groups, while the absorbance at 1774 cm$^{-1}$ relative to the absorbance at 1813 cm$^{-1}$ was used to determine the population of hydrogen-bonded —COOH groups, also called —COOH dimers. When reported herein, the total measured population of —COOH is given, i.e., the sum of singlets and dimers. The absorbance at 1888 cm$^{-1}$ was used to determine the population of —COF end groups, and the absorbance at 1785 cm$^{-1}$ was used to determine the population of —CF=CF$_2$ groups. Absorbances were normalized for film thickness using the 2353 cm$^{-1}$ absorbance.

Melt viscosities of the fluoropolymers were determined by ASTM method D1238-52T modified as described in U.S. Pat. No. 4,380,618.

Thermal characteristics of fluoropolymer resins were determined by DSC by the method of ASTM D-4591-87. The melting temperature reported is the peak temperature of the endotherm on second melting.

Average size of polymer particles as polymerized, i.e., raw dispersion particle size (RDPS), was measured by photon correlation spectroscopy.

In the following, unless otherwise stated, stated solution concentrations are based on combined weight of solvent water and of solute(s). Stated concentrations of polymer solids in dispersions are based on combined weights of solids and aqueous medium, and were determined gravimetrically, i.e., by weighing dispersion, drying, and weighing dried solids, or by an established correlation of dispersion specific gravity with the gravimetric method.

In general, when alkali metal nitrate is added during a wet process step, as in polymerization or isolation, the amount of alkali metal nitrate residue on the dry fluoropolymer resin is calculated from the amount of nitrate added and the fraction of total water present that is carried into drying with the resin. The amount of polymer can be conveniently calculated from the amount of TFE consumed in polymerization and the polymer composition analysis, or can be determined from gravimetric analysis of the dispersion. Isolation procedures were sufficiently uniform in the following Examples that, unless otherwise stated, the amount of alkali metal nitrate residue on a quantity of dried copolymer resin was taken as 15% of the amount of nitrate added to that quantity of resin in the wet state.

Total unstable fraction (TUF) was used as a measure of polymer instability. A weighed sample of copolymer resin was heated at 360° C. in a nitrogen atmosphere, and weight losses $\Delta W_1$ and $\Delta W_2$ were measured after 1 hr and after 2 hr, respectively. I.e., if $W_o$ is the original weight and $W_t$ is the weight after time t measured in hours, then $\Delta W_t = W_o - W_t$. Then, TUF was calculated as TUF=$2\Delta W_1 - \Delta W_2$ and expressed relative to $W_o$ (in %). The difference was taken to separate the effects of unstable entities, judged to occur in relatively short time (less than 1 hr), from background degradation occurring at the high temperature employed. TUF is interpreted as the sum of weight loss due to unstable end groups and of weight loss due to any backbone unstable fraction. For TFE/HFP copolymers, backbone unstable fraction is commonly attributed to HFP diads.

Three color parameters, Luminous Reflectance (%G, sometimes called Green), Yellowness Index (YI) and Whiteness Index (WI), were measured using a HunterLab Tristimulus Colorimeter (Model D25M-9, Hunter Associates Laboratory) to quantify observations about color, making the measurements through clear silica glass. These parameters are known in the art. See, for example, ASTM E-313.

Comparative Example A

A cylindrical, horizontal, water-jacketed, paddle-stirred, stainless steel reactor having a length to diameter ratio of about 1.5 and a water capacity of 80 parts by weight was charged with 50 parts of demineralized water and 0.44 part of a 20 wt % solution of ammonium perfluorooctanoate surfactant (C 8, Fluorad® FC-143, 3M) in water. With the reactor paddle agitated at 35 rpm, the reactor was heated to 60° C., evacuated, purged with TFE, evacuated again, and 0.098 part of chloroform was introduced. The reactor temperature then was increased to 103° C. After the temperature had become steady at 103° C., HFP was added slowly to the reactor until the pressure was 350 psig (2.5 MPa). Then TFE was added to the reactor to achieve a final pressure of 600 psig (4.2 MPa). Then 0.35 part of PEVE was introduced. Then 0.42 part of a freshly prepared aqueous initiator solution containing 0.26 wt % of potassium persulfate (KPS) was charged into the reactor at 0.11 part/min. Then, this same initiator solution was pumped into the reactor at 0.0097 part/min for the remainder of the polymerization. At the same time, PEVE addition was begun at a pumping rate of 0.0019 part/min. This pumping rate was maintained for the remainder of the polymerization. After polymerization had begun as indicated by a 10 psi (0.07 MPa) drop in reactor pressure, additional TFE was added to the reactor to maintain pressure constant at 600 psig until a total of 17.5 parts of TFE had been added to the reactor after kickoff.

Total reaction time was 180 min with a TFE addition rate of 0.1 part/min. The reaction rate was maintained constant by adjusting the agitator speed. At the end of the reaction period, the TFE feed, the PEVE feed, and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 31.5 wt % and raw dispersion particle size (RDPS) was 174 nm. After mechanical coagulation, the polymer was isolated by compressing excess water from the wet polymer, to a water content of approximately 30 wt %, and then drying this polymer in a 150° C. convection air oven. The TFE/HFP/PEVE copolymer had an MV of $2.09 \times 10^3$ Pa·s, an HFPI of 1.90 (6.1 wt % HFP), a PEVE content of 1.91 wt %, a melting point of 282.5° C., a TUF of 0.08%, and 109 —COOH ends/$10^6$ C atoms as polymerized. This polymer then was stabilized by melt extrusion on a 28-mm Werner & Pfleiderer Kombi-plast® extruder, using a standard screw design for melt processible fluoropolymers with a barrel temperature of 320° C. and a die temperature of 340° C., to make strand-cut cubes. The total unstable fraction (TUF) of the extruded resin was 0.03%, indicating good thermal stability. A %G value of 33.7 indicated that color was substantially better than the examples of Morgan & Sloan (%G of 5–18) after extrusion. However, the color of the resin visually was light brown with Yellowness Index (YI) of +15.8 and Whiteness Index (WI) of +18.6, and the fluoropolymer had 12 —COOH, 21 —COF, and 11 —CF=$CF_2$ ends/$10^6$ C atoms.

Example 1

The procedure of Comparative Example A was essentially repeated except that the chloroform precharge was 0.088 part and 0.0066 part of potassium nitrate was added to the reactor at the same time the chloroform was added. Total reaction time was 175 min. Solids content of the dispersion was 31.5 wt % and RDPS was 172 nm. The resultant TFE/HFP/PEVE copolymer had an MV of $2.32 \times 10^3$ Pa·s, an HFPI of 1.62 (5.2 wt % HFP), a PEVE content of 1.71 wt %, a melting point of 281.6° C., a TUF of 0.08%, and 42 —COOH ends/$10^6$ C atoms as polymerized. Based on a water content of 30 wt % after compressing excess water from the wet polymer, the $KNO_3$ residue on the resin after drying was calculated as 49 ppm. After stabilizing the polymer by melt extrusion, as described in Comparative Example A, TUF was 0.06, indicating good thermal stability. Only 16 —COF ends/$10^6$ C atoms were detected (no —COOH or —CF=$CF_2$) and this time the finished resin was visually white with a %G of 46.3, a YI of –7.5 and a WI of 56.7, showing the benefit of adding an alkali metal nitrate such as potassium nitrate in polymerization.

Example 2

The procedure of Comparative Example A was essentially followed, except that the amount of chloroform was 0.072 part and different amounts of $KNO_3$ were added to different aliquots of the raw dispersion before coagulation to achieve desired residues. Solids content of the raw dispersion was 32.5 wt % and RDPS was 174 nm. The TFE/HFP/PEVE copolymer had an MV of $4.47 \times 10^3$ Pa·s, an HFPI of 1.91 (6.1 wt % HFP), a PEVE content of 1.89 wt %, a TUF of 0.09%, and 103 —COOH ends/$10^6$ C atoms as polymerized. The amounts of $KNO_3$ residue were 20 ppm and 200 ppm based on dry copolymer resin solids. Stability and color data for the extruded resin are summarized in Table 1. The TUF and end group data indicate good stability and the color parameters confirm the visual observation of good whiteness, for both levels of $KNO_3$ addition, showing the benefit of the alkali metal nitrate addition during isolation of the fluoropolymer resin from its polymerization medium.

TABLE 1

Stability, End Group, and Color Data for Example 2

| $KNO_3$ | TUF | Color Parameters | | | End Groups (per $10^6$ C Atoms) | | |
|---|---|---|---|---|---|---|---|
| (ppm) | (%) | % G | YI | WI | —COOH | —COF | —CF=$CF_2$ |
| 20 | 0.03 | 46.2 | –11.2 | 62.2 | 5 | 0 | 0 |
| 200 | 0.05 | 46.7 | –11.8 | 63.8 | 0 | 0 | 0 |

Example 3

The procedure of Example 2 was essentially repeated, except that the initiator solution contained 0.13 wt % of ammonium persulfate (APS) and 0.13 wt % of KPS instead of all KPS and ethane was used as the chain transfer agent instead of chloroform. The ethane was introduced in an amount to increase the pressure in the reactor by 279 mmHg. Solids content of the raw dispersion was 31.2 wt % and RDPS was 213 nm. The TFE/HFP/PEVE copolymer had an MV of $2.38 \times 10^3$ Pa·s, an HFPI of 1.83 (5.9 wt % HFP), a PEVE content of 1.94 wt %, a TUF of 0.07%, and 117 —COOH ends/$10^6$ C atoms as polymerized. Stability and color data for the extruded resin are summarized in Table 2. The TUF and end group data indicate good stability and the color parameters confirm the visual observation of good whiteness. In this instance, with ethane as chain transfer agent, the quantitative measures of color indicate better whiteness for the larger amount of $KNO_3$.

TABLE 2

Stability, End Group, and Color Data for Example 3

| $KNO_3$ | TUF | Color Parameters | | | End Groups (per $10^6$ C Atoms) | | |
|---|---|---|---|---|---|---|---|
| (ppm) | (%) | % G | YI | WI | —COOH | —COF | —CF=$CF_2$ |
| 20 | 0.03 | 42.0 | –0.9 | 43.0 | 0 | 0 | 0 |
| 200 | 0.06 | 47.9 | –11.7 | 65.1 | 2 | 0 | 0 |

Example 4

Two batches of TFE/HFP/PEVE copolymer were polymerized in a different reactor using procedures similar to that of Comparative Example A but varying enough to yield different MV. The raw dispersions from these batches were coagulated with addition of $KNO_3$ calculated to leave 40 ppm of $KNO_3$ residue on the dried resin, and the dried copolymer resin powders were blended together. The TFE/HFP/PEVE copolymer powder blend had an MV of $2.5 \times 10^3$ Pa·s, an HFP content of 6.6 wt %, a PEVE content of 1.83 wt %, a TUF of 0.11%, and 146–164 —COOH ends/$10^6$ C atoms. Portions of this copolymer resin were dry blended with 50 or 100 ppm of $KNO_3$ in a three-stage blending procedure, i.e., adding more virgin resin at each stage, to achieve the total amounts of $KNO_3$ present as shown in Table 3 and extruded as above. Data for the extruded resin are summarized in Table 3, including data for the resin extruded without dry $KNO_3$ addition. The data indicate that alkali metal nitrate addition at extrusion can also enhance color and stability.

TABLE 3

Stability, End Group, and Color Data for Example 4

| $KNO_3$ | TUF | Color Parameters | | | End Groups (per $10^6$ C Atoms) | | |
|---|---|---|---|---|---|---|---|
| (ppm) | (%) | % G | YI | WI | —COOH | —COF | —CF=$CF_2$ |
| 40 | 0.06 | 28.4 | 17.6 | 13.1 | 0 | 19 | 0 |
| 90 | 0.07 | 51.2 | 1.7 | 47.3 | 0 | 18 | 0 |
| 140 | 0.09 | 45.9 | −7.1 | 55.2 | 0 | 6 | 0 |

Reference Example

This example illustrates fluoropolymer resins that are suitable and unsuitable for the extrusion process of this invention.

a) TUF was measured to be 0.70% and 0.72% for two samples of raw (as-polymerized) TFE/HFP dipolymer resin prepared generally by the method of Bro & Sandt and having nominal HFPI of 3.85 and MV of about $7.6 \times 10^3$ Pa·s. Such resin would not be suitable feed for the process of this invention.

b) TUF was measured for a series of TFE/HFP/PEVE copolymers prepared generally according to the procedure of Comparative Example A except that PEVE was only precharged, an APS/KPS mixture was used in most instances, and the amounts of ingredients were varied to achieve different results. Variations in ingredient amounts included no CTA in Runs 1–2, no KPS in Run 7, and no APS in Run 8. Results, including copolymer composition and MV, are given in Table 4. Runs 1–2 would not be suitable feed for the process of this invention, but Runs 3–8 would be suitable.

c) TUF was measured for a TFE/PEVE dipolymer prepared generally by the method of Aten et al. in International Patent Application Publication WO97-07147 using APS initiator, ethane chain transfer agent, and with no fluoroliquid present. The copolymer had PEVE content of 2.7 wt %, MV of $2.6 \times 10^4$ Pa·s, and 102 —COOH, 21 —COF and 7 —CF=$CF_2$ ends/$10^6$ C atoms. TUF was measured to be 0.11%, indicating that this fluoropolymer would be suitable for the process of the present invention.

TABLE 4

TUF for Various TFE/HFP/PEVE Copolymers

| Run | HFPI | PEVE (wt %) | MV ($10^3$ Pa · s) | TUF (%) |
|---|---|---|---|---|
| 1 | 4.19 | 0.54 | 2.69 | 0.68 |
| 2 | 3.91 | 0.81 | 1.34 | 0.59 |
| 3 | 2.09 | 1.20 | 1.99 | 0.16 |
| 4 | 1.81 | 1.58 | 2.14 | 0.03 |
| 5 | 2.66 | 1.72 | 1.77 | 0.15 |
| 6 | 2.09 | 1.31 | 1.93 | 0.04 |
| 7 | 2.66 | 1.75 | 2.25 | 0.14 |
| 8 | 2.72 | 1.86 | 2.83 | 0.16 |

Example 5 and Comparative Example B

A TFE/PPVE copolymer was prepared as follows. The autoclave used in Comparative Example A was charged with 52 parts of demineralized water and 0.63 part of a 20 wt % solution of C-8 in water. With the agitator turning at 50 rpm, the aqueous charge was heated to 65° C. and deairated by three times alternately evacuating and purging with TFE. Ethane was introduced to give a pressure rise of 10 inches (25.4 cm) of Hg. Then, to the autoclave were added 0.51 part of PPVE, and 0.0066 part of $KNO_3$. The temperature was increased to 75° C. and the autoclave was pressured with TFE to 300 psig (2.2 MPa). The polymerization was initiated by pumping 0.66 part of a 0.17 wt % solution of APS in water into the autoclave at a rate of 0.11 part/min. Then, the injection rate of APS solution was reduced to 0.011 part/min and PPVE addition was begun at 0.0051 part/min. Both initiator solution and PPVE addition rates were maintained throughout the batch. After the pressure of the autoclave had dropped 10 psig (0.069 Mpa), signaling kickoff, TFE was added to the autoclave to maintain pressure at 300 psig. The agitation rate was adjusted to maintain TFE feed rate at 0.167 part/min. When 20 parts of TFE had been transferred to the autoclave after the initial pressuring step, the agitator and ingredient feeds were stopped and the reactor was slowly vented. After venting to nearly atmospheric pressure, the reactor was purged with nitrogen to remove residual monomer and 77 parts of aqueous dispersion were discharged. Solids content of the dispersion was 30.7 wt %. Polymer solids were isolated and dried as in Comparative Example A. The calculated $KNO_3$ residue on the resin after drying was 60 ppm, based on the amount of water left on the polymer before drying. An aliquot of this dry resin powder was stabilized by extrusion as in Comparative Example A. Cubes obtained from the foregoing extrusion were extruded again with 60 ppm of additional $KNO_3$ introduced by first blending the $KNO_3$ with a small amount of the dry resin powder and then blending this powder with the cubes. Measured properties for the resin at different stages of the experiment are given in Table 5. Initial properties of the resin, i.e., before extrusion, are identified as 5(init), while 5(ex-1) and 5(ex-2) identify the results for extrusion of the resin, respectively, as polymerized and again with additional $KNO_3$. Also given in Table 5 are results for Comparative Example B which was produced essentially by the polymerization procedure of Example 5 except that no $KNO_3$ was added to the autoclave, and the resulting dry resin was extruded as polymerized. Results show that extrusion in the presence of the amount of alkali metal nitrate introduced during polymerization was effective to improve stability, while the two extrusions, with additional alkali metal nitrate introduced before the second extrusion, together were effective to improve stability and color.

TABLE 5

Results for Example 5 and Comparative Example B

| | B(init) | B(ex) | 5(init) | 5(ex-1) | 5(ex-2) |
|---|---|---|---|---|---|
| General properties: | | | | | |
| MV ($10^3$ Pa · s) | 40.3 | 37.4 | 71.8 | 61.1 | 55.4 |
| PPVE content (wt %) | — | 3.68 | — | 3.45 | — |
| Melting point (° C.) | — | 307 | — | 306 | — |
| TUF (%) | — | 0.08 | — | 0.04 | 0.03 |
| End groups (per $10^6$ C): | | | | | |
| —COOH | 100 | 21 | 65 | 0 | 0 |
| —COF | 13 | 20 | 14 | 0 | 0 |
| —CF=$CF_2$ | 16 | 0 | 21 | 0 | 0 |

TABLE 5-continued

Results for Example 5 and Comparative Example B

|  | B(init) | B(ex) | 5(init) | 5(ex-1) | 5(ex-2) |
|---|---|---|---|---|---|
| Color parameters: | | | | | |
| % G | — | 39.5 | — | 39.8 | 38.3 |
| YI | — | 3.0 | — | 5.5 | −0.7 |
| WI | — | 35.7 | — | 32.8 | 39.3 |

What is claimed is:

1. A process for stabilizing and whitening melt-fabricable fluoropolymer resin having total unstable fraction of no more than 0.3%, comprising melt extruding said resin in the presence of alkali metal nitrate to obtain fluoropolymer resin having improved color and/or stability, said fluoropolymer resin having been made by aqueous dispersion polymerization and said presence of said nitrate in said fluoropolymer resin being obtained by said nitrate having been introduced into said aqueous polymerization of said fluoropolymer resin.

2. A process for stabilizing and whitening melt-fabricable fluoropolymer resin having total unstable fraction of no more than 0.3%, comprising melt extruding said resin in the presence of alkali metal nitrate to obtain fluoropolymer resin having improved color and/or stability, said nitrate having been introduced into the dispersion product of aqueous polymerization of said fluoropolymer before isolation of said fluoropolymer resin from said dispersion.

3. A process for stabilizing and whitening melt-fabricable fluoropolymer resin having total unstable fraction of no more than 0.3%, comprising melt extruding said resin in the presence of alkali metal nitrate to obtain fluoropolymer resin having improved color and/or stability, said nitrate having been introduced into said fluoropolymer resin prior to any melt extrusion of said resin.

\* \* \* \* \*